Sept. 13, 1938.   D. H. BRANDES   2,130,260
POSITION SIGNALING DEVICE
Filed April 29, 1936
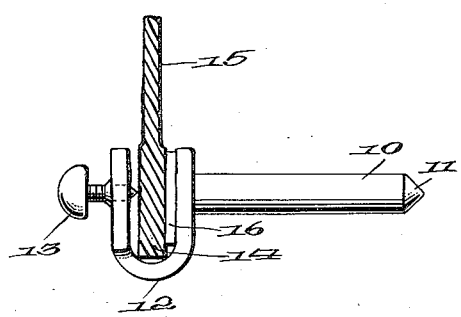
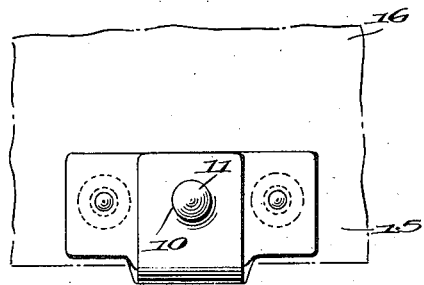
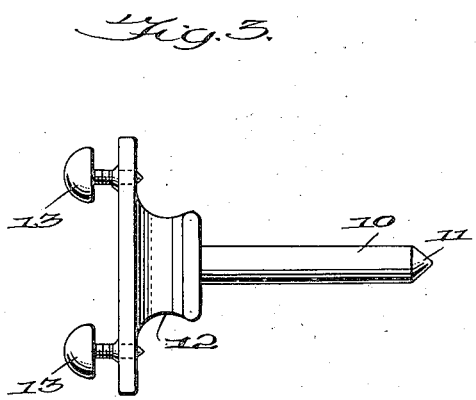
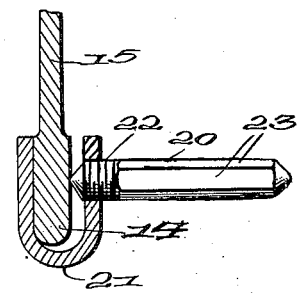
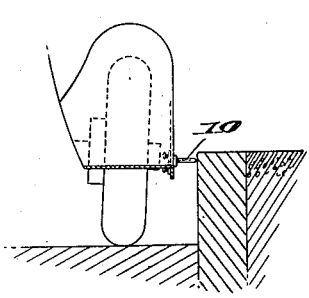
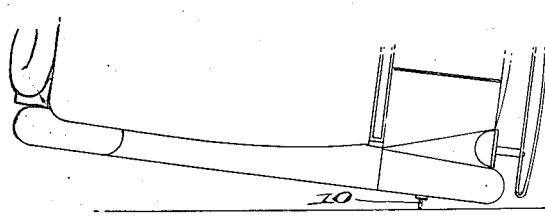
Inventor
Dedrick H. Brandes,
By Edmund H. Parry Jr
Attorney Patented Sept. 13, 1938

2,130,260

UNITED STATES PATENT OFFICE 2,130,260

POSITION SIGNALING DEVICE

Dedrick H. Brandes, White Plains, N. Y.

Application April 29, 1936, Serial No. 77,034

7 Claims. (Cl. 116—67)

This invention relates to an alarm device for use on an automobile.

Experience among drivers has shown that the outer extremities and particularly the fenders of an automobile are subject to great damage when the automobile is being parked adjacent a curbing or within a small enclosure. Ordinarily in parking a car in the street in a small parking place it is necessary to direct the car at an angle to the curbing. It is necessary most of the time to back the car into a small parking space in which case the rear end of the car is directed at an angle to the curb and the front wheels swung around so as to place the car in parallel alinement with the curb. The bumper of the automobile which ordinarily meets an obstruction first and thus protects the car is of no value in parking since the fenders extend laterally of the car a greater distance than the bumpers, with the result that often the fenders meet an obstruction first, resulting in marred or bent fenders.

In the present day car with its low sweeping fenders and those of streamline design the fenders are often dented or deformed when the car is being backed into a parking place because of the driver's inability to properly see conditions at the right side of the car from his position in the driver's seat. Cars ordinarily are backed into a parking place more by chance or a sense of feeling with the result that an obstruction is met and the damage done before the driver is given any warning.

The essential object of my invention is to provide an attachment adapted to be connected to the fender or other side parts of an automobile and project therefrom to protect the same against injury in parking, and which upon contact with a curb or other obstruction will produce a warning signal and enable the driver to manipulate the automobile before the automobile itself engages the obstruction.

Another object of my invention is to provide a device which is readily applied to the outer side parts of an automobile and which functions through the portion to which it is applied to give a warning signal to the driver.

A more specific object of the invention is to provide a device which may be applied to a vibratable part of an automobile, such as the fenders, bumpers or running boards, and which will upon contacting an obstruction give a warning by causing the member to which it is applied to vibrate and produce a sonic signal.

By way of example I have shown several embodiments of my invention in which:

Fig. 1 is a sectional view of one embodiment of the device attached to the edge portion of a fender.

Fig. 2 is a view in elevation of the same.

Fig. 3 is a top plan view of the device and mounting therefor.

Fig. 4 is a view, partly in section, of a modified form for mounting the device.

Figs. 5 and 6 are diagrammatic views showing the device in use.

Essentially the invention comprises a feeler element 10, shown in Figures 1 and 3 of the drawing, which preferably is of rigid construction although not necessarily so, and is adapted to project outwardly beyond the edge of the fender or other side part of the automobile. The feeler should be sufficiently durable to withstand contact with an obstruction and usually will be made of hard bar steel. The outer end portion may be tapered to a blunt point 11 so as to be sensitive to small irregularities in the curb or other obstruction with which it may contact.

The feeler will normally be provided with a mounting by which the same may be secured in position so as to project outward laterally beyond the side extremities of the automobile. The feeler can be connected with its mounting through welding or by a screw joint, or in any other manner which will give a strong connection.

It will normally be most convenient to secure the feeler at the edge extremity of the automobile, in which event the mounting may conveniently take the form of a U-shaped clamp 12. The inner end of the feeler 10 may be anchored to one side arm of the clamp, and in the other arm may be provided suitably set screws 13. The device in Figures 1 and 4 is illustrated as being connected at the edge bead 14 of a car fender 15. By tightening of the set screws the clamp will be rigidly secured in position. To prevent marring of the paint on the outer side of the fender a small pad 16 of rubber or other material may be secured to the inner face of the feeler-supporting arm of the clamp.

A slightly different arrangement is shown in Figure 4. Instead of providing separate locking screws, the outer arm of the bracket 21 is provided with a threaded aperture. The feeler 20 is provided with a threaded inner end 22 and slightly pointed at its extremity. Beyond the threaded portion the feeler is provided with a portion of hexagonal cross section, presenting a series of flat faces 23. With such arrangement the feeler may be fixed in the clamp by means of a wrench so as to securely engage with the fender portion 14 and firmly anchor the whole device in position.

It will be understood that the feeler need not necessarily be anchored at the edge extremity of the fender or other side part of the automobile, although this is most convenient as it enables the feeler to be made relatively short and yet project outwardly beyond the extremity of the car.

The operation of the device will be understood by reference to Figures 5 and 6, wherein the device is illustrated as connected with the side flange of the right front fender of an automobile. As the car approaches relatively close to a curb or other obstruction the feeler 10 will engage the obstruction and a vibration will be set up therein. Because of the rigid connection between the mounting and the fender such vibration will be transmitted into the fender which, being made of sheet metal, will also vibrate and set up a sonic signal that will warn the driver.

It will be understood that the form of the invention herein shown and described is merely a preferred example and that various changes in the shape, size, and arrangement of parts may be resorted to without departing from the spirit of the invention or the scope of the appended claims.

I claim:

1. An automobile attachment adapted to produce a sonic signal in a vibratable side portion of an automobile comprising a feeler element integral in its entirety and having an obstruction engaging portion operative when scraping along an obstruction to vibrate the feeler element, and a mounting rigidly secured to the feeler element for transmitting the vibrations of the feeler element and adapted to be rigidly secured to said vibratable side portion of an automobile with the feeler element projecting laterally outward therefrom.

2. An automobile warning attachment operating to produce a sonic signal in the fender of an automobile when the fender is about to scrape against a curb or other obstruction and comprising, a rigid metal feeler pin integral in its entirety, and a rigid fender engaging mounting rigidly secured to the feeler pin and adapted to firmly anchor the feeler pin to the fender with said pin projecting laterally outward beyond the fender.

3. An automobile attachment adapted to produce a sonic signal in the fender of an automobile when the fender is about to strike a curb or other obstruction and comprising, a mounting adapted to be fixed to the automobile fender, and a metal feeler rigid with the mounting and supported thereby in such a manner as to project laterally outward beyond the side of the fender.

4. In combination, an automobile having a vibratable side portion, a mounting secured to the vibratable side portion, and an elongated feeler element rigidly secured to the mounting and projecting laterally outward beyond the side extremity of said automobile portion, said feeler element being adapted to scrape along an obstruction and transmit through the vibratable side portion of the automobile a sonic signal.

5. In combination, an automobile fender and a feeler element rigidly anchored to the fender and of such length as to project outward laterally beyond said fender, said feeler element being adapted upon scraping an obstruction to set up a vibration in the fender and produce a sonic signal.

6. In combination, an automobile fender and a warning attachment, said attachment comprising a mounting rigidly secured to the fender, a feeler element rigidly attached to the mounting and projecting laterally outward beyond the side extremity of the fender, said feeler element having an obstruction engaging portion operative when scraping along an obstruction to vibrate the feeler element and produce a sonic signal in the automobile fender.

7. In combination, an automobile fender and a warning attachment, said attachment comprising a mounting rigidly secured to the fender and having rigidly fixed thereto a feeler element, said feeler element extending laterally outward beyond said fender and operative when scraping along an obstruction to vibrate the fender and produce a sonic signal.

DEDRICK H. BRANDES.